No. 636,091. Patented Oct. 31, 1899.
E. R. WATERMAN & R. R. MORISON.
FLUID HEATING APPARATUS.
(Application filed May 11, 1899.)

(No Model.)

Witnesses,
J. H. Anna
E. A. Brandau

Inventors,
Edwin R. Waterman
Robert R. Morison
By Dewey Strong & Co.
Attys.

UNITED STATES PATENT OFFICE.

EDWIN R. WATERMAN AND ROBERT R. MORISON, OF SAN FRANCISCO, CALIFORNIA; SAID WATERMAN ASSIGNOR TO PERCY S. REGNART, OF SAME PLACE.

FLUID-HEATING APPARATUS.

SPECIFICATION forming part of Letters Patent No. 636,091, dated October 31, 1899.

Application filed May 11, 1899. Serial No. 716,345. (No model.)

*To all whom it may concern:*

Be it known that we, EDWIN R. WATERMAN and ROBERT R. MORISON, citizens of the United States, residing in the city and county of San Francisco, State of California, have invented an Improvement in Fluid-Heating Apparatus; and we hereby declare the following to be a full, clear, and exact description of the same.

Our invention relates to an apparatus which is especially designed for heating liquids.

It consists in the parts and in the constructions and combinations of parts hereinafter described and claimed.

Figure 1:
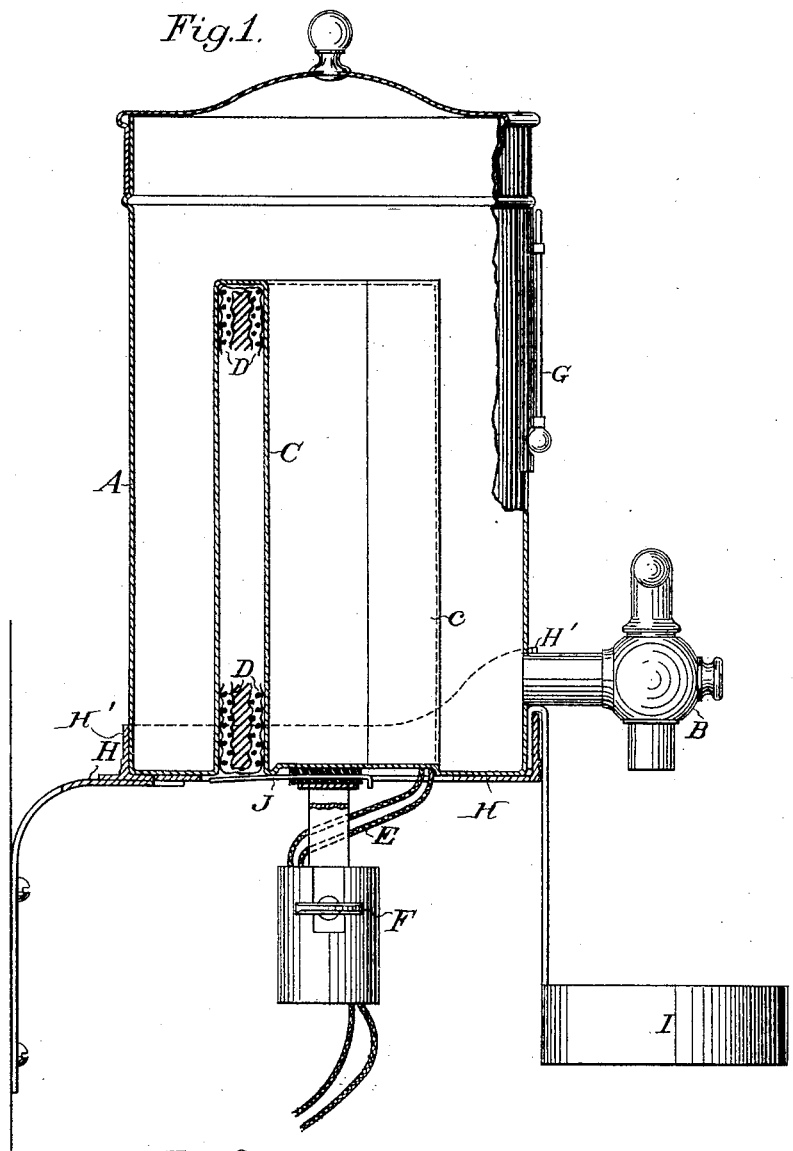
Figure 2:
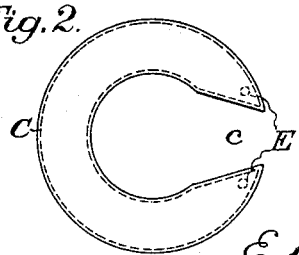

Figure 1 is a vertical section of the apparatus. Fig. 2 is a view showing one form of heater adapted for this use.

A is the exterior containing vessel, which in the present case is shown in the form of a cylinder closed at top and bottom and having a draw-off cock B at one side. Water may be supplied to this chamber by any suitable connecting-pipe from a source of supply, this not being shown.

Within a chamber or vessel A and centrally secured to the bottom is a double-walled chamber C, extending upward within the outer vessel and having a closed top. The bottom of the outer vessel has an opening made in it of a shape to receive the bottom of this double-walled chamber C, which is soldered or otherwise hermetically sealed to the bottom of the vessel A, leaving an opening from below which coincides with the shape of the interior chamber C and forms a communication with the space between the double walls. These double walls are separated at one or more points, so that as constructed this chamber is in horizontal section of an arched or horseshoe form, with an opening extending along one side, as at c, communicating freely with the interior of the outer vessel A, so that when the latter is filled with water or other fluid to be heated this fluid can pass freely around and into the interior portion of the inner chamber, the bottom of this central portion of the chamber being closed and coincident with the bottom of the outer chamber, while the open channel from below connects with the space between the outer and inner walls of this chamber C. This construction provides for a rapid diffusion of heat from both the outer and the inner walls of the chamber C, since the fluid will be in contact with both, and heat from any heating device supplied from between these walls produces the required result. We have here shown as convenient for this purpose an electrical heater which may be of any well-known or suitable description. In the present case we have shown the heater as curved into a C shape to fit the curvature of the space between the outer and inner walls of the chamber C, and it consists of a core wound with wire having a sufficient resistance to the electrical current which is to be passed through it, so that the temperature will be raised and the heat thus applied to the entire interior surface between the walls of the chamber C. This heating-coil is made as shown at D and is properly insulated by mica or other insulating covering which separates it from actual contact with the walls of the chamber into which it is introduced. Wires E connect the coil with suitable terminals, and any well-known or desired form of switch, as at F, may be employed to apply the electrical current or cut it off. With this construction it is only necessary to apply the electrical current through the coil, and the heat therefrom will be rapidly disseminated through the walls of the surrounding chamber and a body of liquid within can be heated to any desired degree.

A thermometer may be attached to the heater, as shown at G, which will show the temperature of the liquid, and the electrical current may be cut off whenever the desired temperature has been reached.

The conducting capacity of the surrounding chamber C will maintain the heat for a considerable time, and it can be added to at intervals by turning on the current as needed.

For convenience for such purposes as the device may be used we have shown a bracket with a receiver H, having a deep flange H', into which the vessel A may be set, being a central opening in the part H, through which the conducting-wires pass, as shown. A cup may also be supported beneath the faucet by means of a hanger I. The heating-coil is introduced into the channel of the chamber C from below and may be locked therein by a key, as shown at J. This key being removed allows the coil to be taken out at any time.

The parts are all insulated to prevent any short-circuiting.

Having thus described our invention, what we claim as new, and desire to secure by Letters Patent, is—

1. A fluid-heating apparatus comprising an exterior containing vessel having rigid therewith an interior double-walled chamber segmental in cross-section said chamber having its double walls closed at the top and open at the bottom, and having one side in open communication with the exterior vessel, an electric heater introduced through the lower open walls of the double-walled chamber and adapted to occupy the space between the double walls, means for supporting the vessel and chamber and means for removably securing the heater in position.

2. A fluid-heating apparatus consisting of an exterior containing vessel, a central segmental chamber having double walls, the space between which is closed at the top and an open communication through the bottom of the main chamber, the inner wall of said chamber forming an interior space having an open communication with the main chamber, an electrical heating device corresponding in shape with the space between the walls of the inner chamber, a locking device engaging the heater from below whereby it is removably held in position therein and means for insulating it from the walls of the chamber, conducting-wires through which an electrical current is passed through the heater, and a means for applying or cutting off the current.

3. The combination with a containing vessel having a chamber with double walls open from below, a removable heater between said walls, means for supporting said vessel consisting of a bracket provided with a flanged receiver into which the vessel is set said receiver having an open bottom to permit the insertion and removal of the heater from below, and means for removably securing the heater in place.

In witness whereof we have hereunto set our hands.

EDWIN R. WATERMAN.
ROBERT R. MORISON.

Witnesses:
S. H. NOURSE,
JESSIE C. BRODIE.